(12) United States Patent
Roberts

(10) Patent No.: US 7,951,464 B2
(45) Date of Patent: May 31, 2011

(54) COMPOSITE MATERIAL WITH FIBER ALIGNMENT

(75) Inventor: Herbert Chidsey Roberts, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/553,032

(22) Filed: Sep. 2, 2009

(65) Prior Publication Data

US 2011/0052898 A1  Mar. 3, 2011

(51) Int. Cl.
*H01F 3/02* (2006.01)
(52) U.S. Cl. ............... 428/553; 428/611; 428/298.1; 428/298.7
(58) Field of Classification Search .......... 428/375, 428/298.1, 379, 380, 553, 611
See application file for complete search history.

(56) References Cited

U.S. PATENT DOCUMENTS

| | | | |
|---|---|---|---|
| 3,606,667 A | 9/1971 | Kreider | |
| 3,706,614 A * | 12/1972 | Kirkpatrick et al. | 156/151 |
| 3,933,536 A | 1/1976 | Doser | |
| 4,853,101 A | 8/1989 | Hruska et al. | |
| 5,970,843 A | 10/1999 | Strasser et al. | |
| 6,783,798 B2 * | 8/2004 | Koslow | 427/128 |
| 6,815,609 B1 | 11/2004 | Wang et al. | |
| 7,063,801 B2 * | 6/2006 | Sato | 252/62.51 R |
| 7,662,468 B2 * | 2/2010 | Bainbridge | 428/304.4 |
| 2003/0082396 A1 * | 5/2003 | Koslow | 428/553 |
| 2003/0215663 A1 * | 11/2003 | Koslow | 428/553 |
| 2006/0202355 A1 | 9/2006 | Majidi et al. | |
| 2008/0044680 A1 * | 2/2008 | Thibodeau et al. | 428/547 |
| 2010/0061877 A1 * | 3/2010 | Sadaka et al. | 419/64 |
| 2010/0173116 A1 * | 7/2010 | Bainbridge | 428/72 |

* cited by examiner

*Primary Examiner* — N. Edwards
(74) *Attorney, Agent, or Firm* — Fletcher Yoder

(57) ABSTRACT

A composite material may be provided with unique alignment characteristics. The composite material may include a matrix material and a plurality of fibers disposed in the matrix material, wherein the plurality of fibers is magnetically aligned in a uniform spacing within the matrix material.

23 Claims, 7 Drawing Sheets

COMPOSITE MATERIAL WITH FIBER ALIGNMENT

BACKGROUND OF THE INVENTION

The subject matter disclosed herein relates to a composite material. More particularly, the subject matter disclosed herein relates to alignment of fibers in a composite material.

A composite material is generally described as an engineered material made from two or more constituent materials with different characteristics. For example, a composite material may include a matrix material that supports and surrounds a reinforcing material. The arrangement of the reinforcing material within the matrix material can affect the overall material quality, e.g., strength. Unfortunately, the arrangement of the reinforcing material is often non-uniform, resulting in reduced material quality.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a composite material includes a matrix material and a plurality of fibers disposed in the matrix material. The plurality of fibers is magnetically aligned in a uniform spacing within the matrix material.

In a second embodiment, a composite material includes a matrix material and a plurality of reinforcing elements disposed in the matrix material. Each reinforcing element of the plurality of reinforcing elements comprises a magnetic coating disposed about a core.

In a third embodiment, a system includes an apparatus made of a composite material, wherein the composite material comprises a matrix material and a plurality of reinforcing elements disposed in the matrix material. Each reinforcing element of the plurality of reinforcing elements comprises a magnetic coating disposed about a core. The magnetic coating comprises a plurality of magnetic particles disposed in a binder material.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In certain embodiments, as discussed in detail below, a uniquely self-aligned composite material includes a matrix material that supports and surrounds a reinforcing material (e.g., multiple distributed elements), wherein the reinforcing material is magnetically aligned within the matrix material. The reinforcing material may include particles, fibers, or any other suitable reinforcing elements. The magnetic force may be applied internally or externally to align the reinforcing material in a desired arrangement (e.g., uniform spacing) within the matrix material. For example, in certain embodiments, the reinforcing material may include magnetic material to define a magnetic field, such that the reinforcing material is capable of self-alignment in the matrix material. The magnetic material may be up to 100 percent of the reinforcing material. However, embodiments of the reinforcing material may include less than approximately 5, 10, 15, 20, 25, 30, 40, or 50 percent of magnetic material. One embodiment of the reinforcing material includes a magnetic core surrounded by one or more coatings. Another embodiment of the reinforcing material includes a core surrounded by one or more coatings, including a magnetic coating. As appreciated, the magnetic field generated by this magnetic material enables the reinforcing material to self-align into a uniform spacing within the matrix material, thereby substantially improving the overall material quality, e.g., strength.

Figure 1:
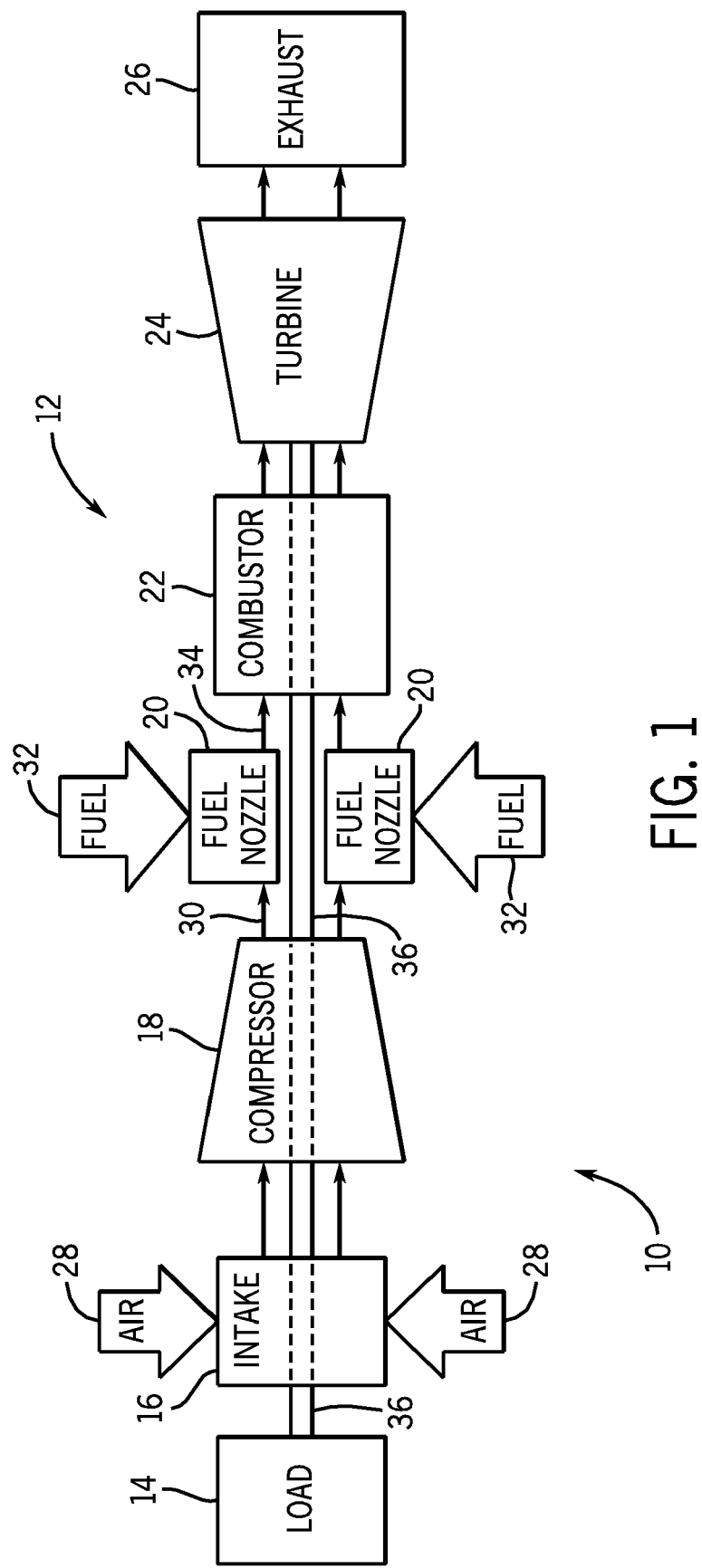
FIG. 1 a block diagram of a turbine system having various components made with a uniquely self-aligned composite material in accordance with an embodiment of the present technique.

FIG. 1 is a block diagram of an embodiment of a turbine system 10, which may include a variety of components constructed with a uniquely self-aligned composite material as described below. In the illustrated embodiment, the turbine system 10 includes a turbine engine 12 coupled to a load 14, e.g., an electrical generator. In one embodiment, the turbine engine 12 may be a 7FA gas turbine engine manufactured by General Electric Company, Greenville, S.C. The turbine engine 12 includes an air intake 16, a compressor 18, one or more fuel nozzles 20, a combustor 22, a turbine 24, and an exhaust 26. As appreciated, the compressor 18 may include any number of stages, e.g., 1 to 20 stages, of compressor blades rotatable in shrouds. Likewise, the turbine 24 may include any number of stages, e.g., 1 to 20 stages, of turbine blades rotatable in shrouds. The combustor 18 also may include a single combustor or multiple combustors (e.g., 2 to 10).

In operation, the turbine engine 12 routes air 28 through the air intake 16 and the compressor 18, which generates compressed air 30 for combustion and cooling flows. In the illustrated embodiment, the fuel nozzles 20 receive at least a portion of the compressed air 30 and a fuel 32, which are then directed into a combustion zone of the combustor 22 as indicated by arrows 34. A portion of the compressed air 30 also may flow along the combustor 22 and/or the turbine 24 for cooling purposes. Inside the combustor 22, the air 30 and fuel 32 mix and combust to generate hot products of combustion, which then flow into and through the turbine 24 and the exhaust 26. These combustion gases drive turbine blades to rotate within the turbine 24, thereby driving a shaft 36 to rotate the compressor 18 and the load 14.

Figure 2:
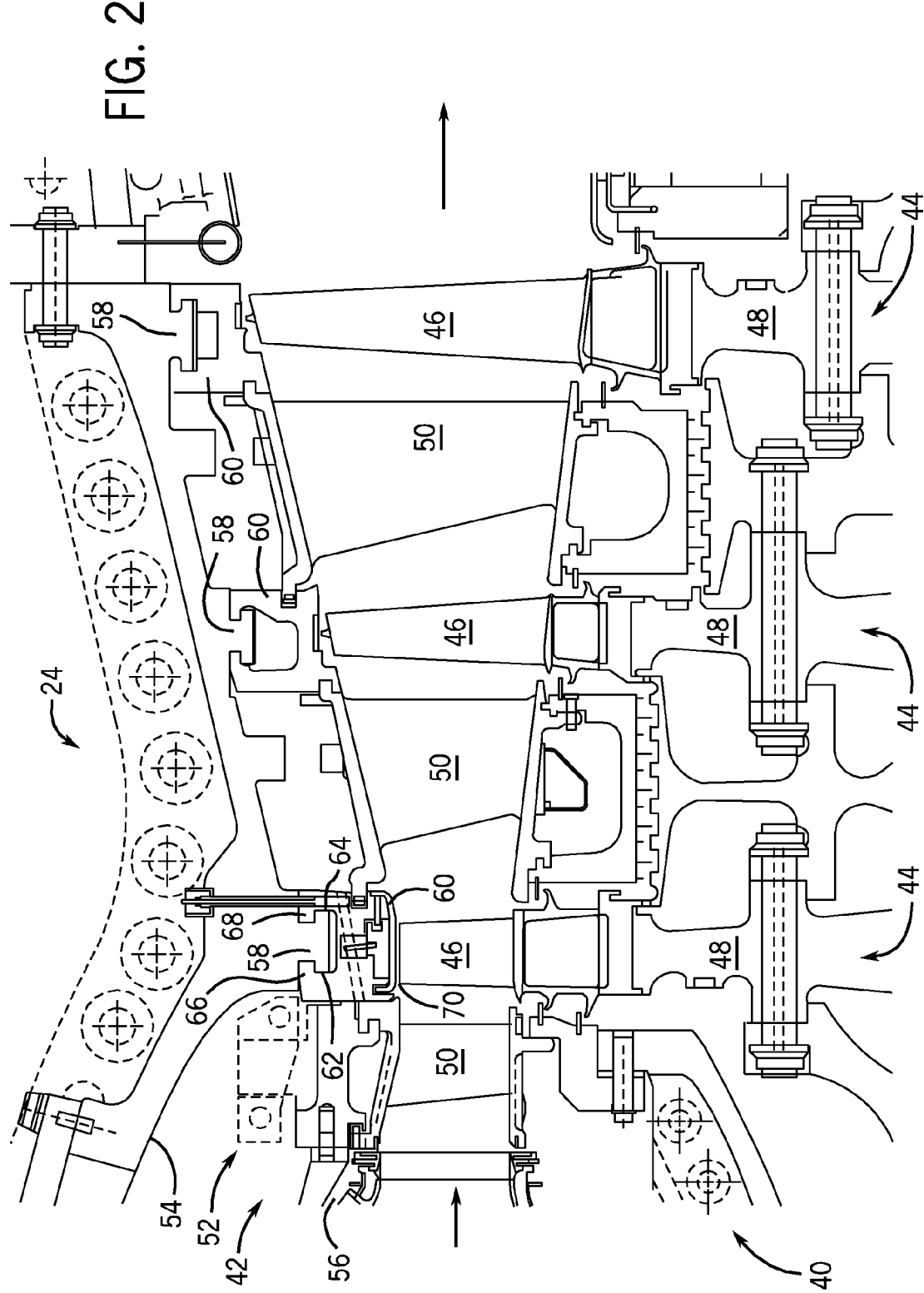
FIG. 2 is a partial cross-sectional side view of a turbine, as shown in FIG. 1, having various components made with a uniquely self-aligned composite material in accordance with an embodiment of the present technique.

FIG. 2 is a partial cross-sectional view of an embodiment of the turbine 24 of FIG. 1. In the illustrated embodiment, the turbine 24 includes a rotor 40 circumferentially surrounded by a stator 42, wherein the turbine 24 includes a plurality of axially spaced turbine stages 44. In each stage 44, the rotor 40 includes a plurality of turbine blades 46 mounted in a circumferentially arrangement about a wheel 48, and the stator 42 includes a plurality of stator vanes 50 mounted in a similar circumferential arrangement about a casing 52. The illustrated casing 52 includes an outer casing 54 and an inner liner 56, wherein the outer casing 54 has a plurality of hangers 58 supporting shroud segments 60. In particular, each hanger 58 includes a pair of hooks 62 and 64, which mate with complementary hooks 66 and 68 of the respective shroud segment 60. These shroud segments 60 generally align with the turbine blades 46 in each stage 44, and define a clearance 70. In operation, the hot combustion gases flow through each stage 44, thereby driving rotation of the turbine blades 46 within the respective shroud segments 60. In certain embodiments, various components of the turbine 24 (e.g., the blades 46, the stator vanes 50, or the shroud segments 60) may be constructed with a uniquely self-aligned composite material as described below, which may include ceramic matrix composite (CMC) materials.

Figure 3:
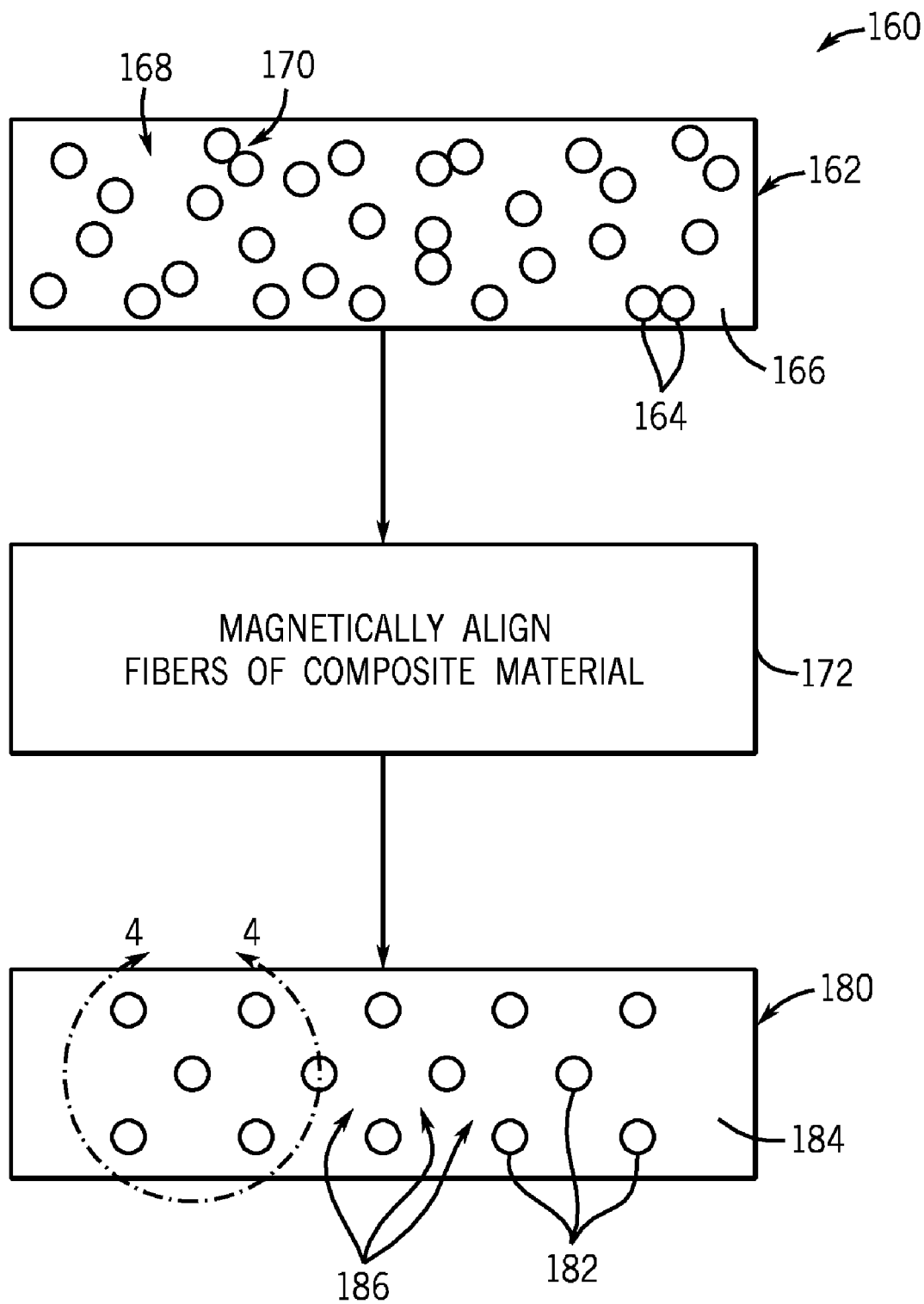
FIG. 3 is a flow chart illustrating magnetic alignment of reinforcing fibers in a matrix material of a uniquely self-aligned composite material in accordance with an embodiment of the present technique.

FIG. 3 is a flow chart illustrating a process 160 of magnetic alignment of reinforcing fibers in a matrix material of a uniquely self-aligned composite material in accordance with an embodiment of the present technique. As illustrated, the process 160 includes a non-aligned composite material 162 having a plurality of randomly spaced reinforcing fibers 164 disposed in a matrix material 166. As appreciated, the random spacing of the fibers 164 reduces the quality of the composite material 162. For example, the random spacing of the fibers 164 results in regions with overly broad spacing 168 and overly narrow spacing 170, thereby causing non-uniformity in the strength of the composite material 162. The overly broad spacing 168 may represent an area of weakness, wherein a failure may occur. The overly narrow spacing 170 may include fibers 164 directly abutting one another, thereby further degrading the quality of the composite material 162.

As illustrated in block 172 of FIG. 3, the process 160 magnetically aligns fibers of a composite material to address the problems associated with the random spacing of fibers 164 of the composite material 162. Although the present discussion refers to fibers 164, any suitable shape or form of reinforcing material may be distributed throughout the matrix material 184. In the illustrated embodiment, block 172 of the process 160 results in a self-aligned composite material 180 having uniformly spaced fibers 182 disposed in a matrix material 184. In certain embodiment, the process 160 may induce magnetic alignment of the fibers 182 via an internal or external magnetic field. For example, as discussed in detail below, certain embodiments of the fibers 182 may include a magnetic material configured to enable the fibers 182 to produce self-aligning magnetic forces. As a result, the fibers 182 are magnetically self-aligned into a uniform spacing 186 within the matrix material 184, rather than allowing overly broad spacing 168 and/or overly narrow spacing 170. The uniform spacing 186 of the fibers 182 substantially improves uniformity in material characteristics, and thus strength of the self-aligned composite material 180.

Figure 4:
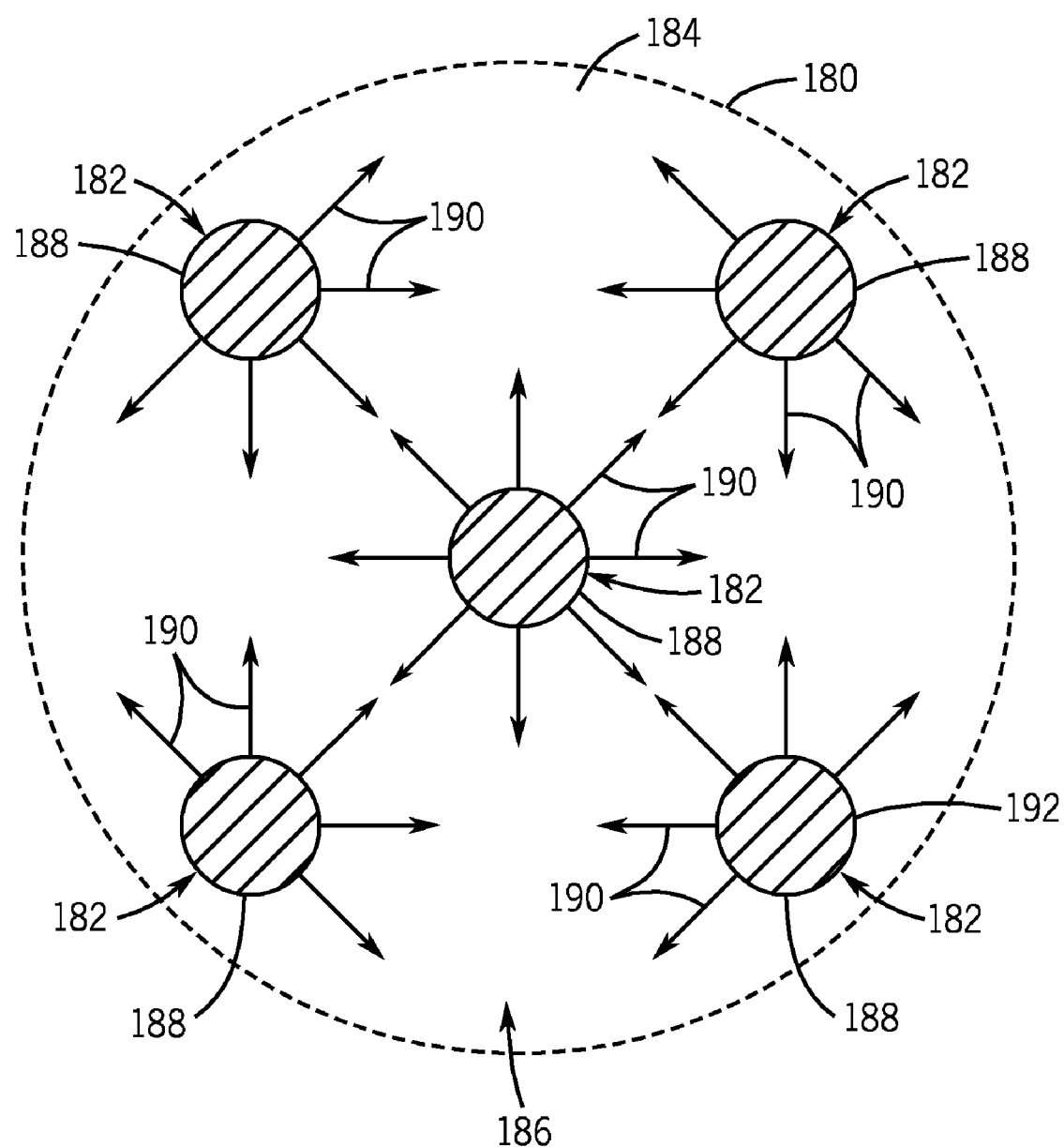
FIG. 4 is a schematic of an embodiment of the self-aligned composite material taken within line 4-4 of FIG. 3, illustrating reinforcing fibers with a magnetic body that produces self-aligning magnetic forces.

FIG. 4 is a schematic of an embodiment of the self-aligned composite material 180 taken within line 4-4 of FIG. 3, illustrating reinforcing fibers 182 with a magnetic body 188 that produces self-aligning magnetic forces 190. In the illustrated embodiment, each reinforcing fiber 182 is made substantially or entirely of a magnetic material to form the magnetic body 188. In other words, each magnetic body 188 may represent a single material composition that is magnetic throughout its interior. For example, the magnetic body 188 may be made of iron, nickel, cobalt, or their compounds. More specifically, the magnetic body 188 may be made of a magnetically soft material having a high magnetic permeability and a low coercivity, e.g., a Supermalloy. The Supermalloy may be an alloy of nickel, molybdenum, and iron, e.g., in percentages of approximately 80 percent nickel, 5 percent molybdenum, and 14 percent iron ($Ni_{80}FE_{14}MO_5$). The matrix material 184 may include a variety of non-magnetic metals, ceramics, plastics, wood, concrete, and so forth. For example, the matrix material 184 may be made of silicon.

As appreciated, the magnetic body 188 may have a variety of shapes and sizes. For example, the magnetic body 188 may be a short fiber of magnetic material. However, the magnetic body 188 is not limited to a fiber shape, but rather the magnetic body 188 may include a variety of shapes, such as spherical, oval, rectangular, and so forth. The size of the magnetic body 188 also may vary. For example, the magnetic body 188 may range between approximately 1 nm to 1 mm, or 1 nm to 500 nm, or 1 nm to 100 nm in thickness.

As illustrated, the self-aligning magnetic forces 190 extend completely around the magnetic body 188 of each fiber 182. In certain embodiments, the self-aligning magnetic forces 190 are uniform about an exterior 192 of each fiber 182, while also being uniform from one fiber 182 to another. The uniformity of these self-aligning magnetic forces 190 enables the fibers 182 to self-align with one another inside the matrix material 184. In other words, the self-aligning magnetic forces 190 bias the fibers 182 into the uniform spacing 186, e.g., during and/or after manufacturing.

The self-aligning magnetic forces 190 may be described as providing both active alignment and resistance to misalignment without any external assistance (e.g., spacers). For example, the self-aligning magnetic forces 190 may actively align the fibers 182 into the uniform spacing 186 during manufacture, while resisting or blocking misalignment of the fibers 182 after manufacture. The self-aligning magnetic forces 190 are essentially opposing magnetic fields between the fibers 182. These opposing magnetic fields stabilize the position of the fibers 182 to resist fiber shifting or fiber contact regardless of the disturbing force. If any shifting occurs, then the magnetic forces 190 automatically bias the fibers 182 back toward the uniform spacing 186. In this manner, the magnetic forces 190 also may be described as self-correcting. As a result, the self-aligning magnetic forces 190 serve to increase quality of the composite material 184, as the uniform spacing 186 of fibers 182 substantially increases strength.

Figure 5:
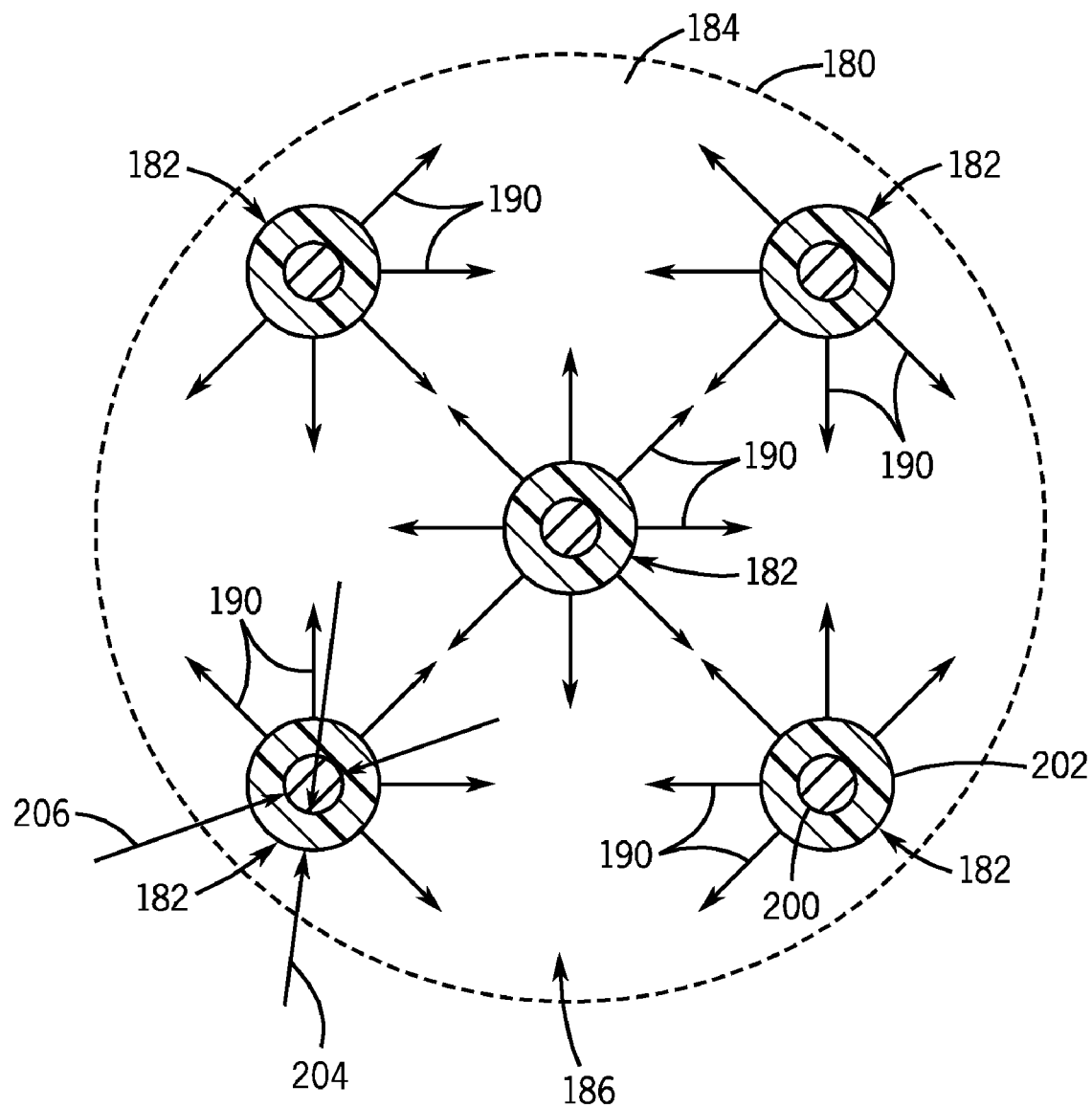
FIG. 5 is a schematic of an embodiment of the self-aligned composite material taken within line 4-4 of FIG. 3, illustrating reinforcing fibers with a magnetic core surrounded by a coating.

FIG. 5 is a schematic of an embodiment of the self-aligned composite material 180 taken within line 4-4 of FIG. 3, illustrating reinforcing fibers 182 with a magnetic core 200 surrounded by a coating 202. For example, the magnetic core 200 may be made of iron, nickel, cobalt, or their compounds. More specifically, the magnetic core 200 may be made of a magnetically soft material having a high magnetic permeability and a low coercivity, e.g., a Supermalloy. The Supermalloy may be an alloy of nickel, molybdenum, and iron, e.g., in percentages of approximately 80 percent nickel, 5 percent molybdenum, and 14 percent iron ($Ni_{80}FE_{14}MO_5$). The coating 202 may be made with a different magnetic material, a plastic, a ceramic, or any other suitable material. More specifically, the coating 202 may be a protective coating, such as a polymer coating, a zinc coating, or a combination thereof. In certain embodiments, the coating 202 may have a thickness 204 of less than approximately 5, 10, 15, 20, 30, 40, or 50 percent of a diameter 206 of the magnetic core 200. For example, the thickness 204 of the coating 202 may range between approximately 1 to 5 percent of the diameter 206 of the magnetic core 200. An exemplary embodiment of the coating 202 may be a nanocoating of approximately 1 to 500 nm, 1 to 300 nm, or 1 to 100 nm in thickness 204.

The self-aligned composite material 180 may be formed by a variety of techniques. For example, a preparation process may begin with preparation of the reinforcing fibers 182, followed by distribution of the fibers 182 in the matrix material 184. In certain embodiments, the preparation process may include forming the coating 202 by precipitating a desired coating material (e.g., polymer) onto the magnetic core 200 of each fiber 182. For example, the preparation process may include forming a coating solution by dissolving the desired coating material in a solvent. The preparation process may then proceed to mix a multitude of magnetic cores 200 with the coating solution. The preparation process may then add an insoluble substance to the solution to induce precipitation of the desired coating material onto the multitude of magnetic cores 200, thereby forming the fibers 182 (e.g., coated magnetic cores). The preparation process may then separate the fibers 182 from the coating solution and dry the fibers 182. Finally, the preparation process may combine the fibers 182 with the matrix material 184 in a mold under the influence of a magnetic field. However, as appreciated, the disclosed embodiments may employ any suitable techniques to prepare the self-aligned composite material 180.

Again, similar to the embodiment of FIG. 4, the magnetic core 200 provides the self-aligning magnetic forces 190 completely around the respective fiber 182. In certain embodiments, the self-aligning magnetic forces 190 are uniform about each fiber 182, while also being uniform from one fiber 182 to another. The uniformity of these self-aligning magnetic forces 190 enables the fibers 182 to self-align with one another inside the matrix material 184. In other words, the self-aligning magnetic forces 190 bias the fibers 182 into the uniform spacing 186, e.g., during and/or after manufacturing.

Figure 6:
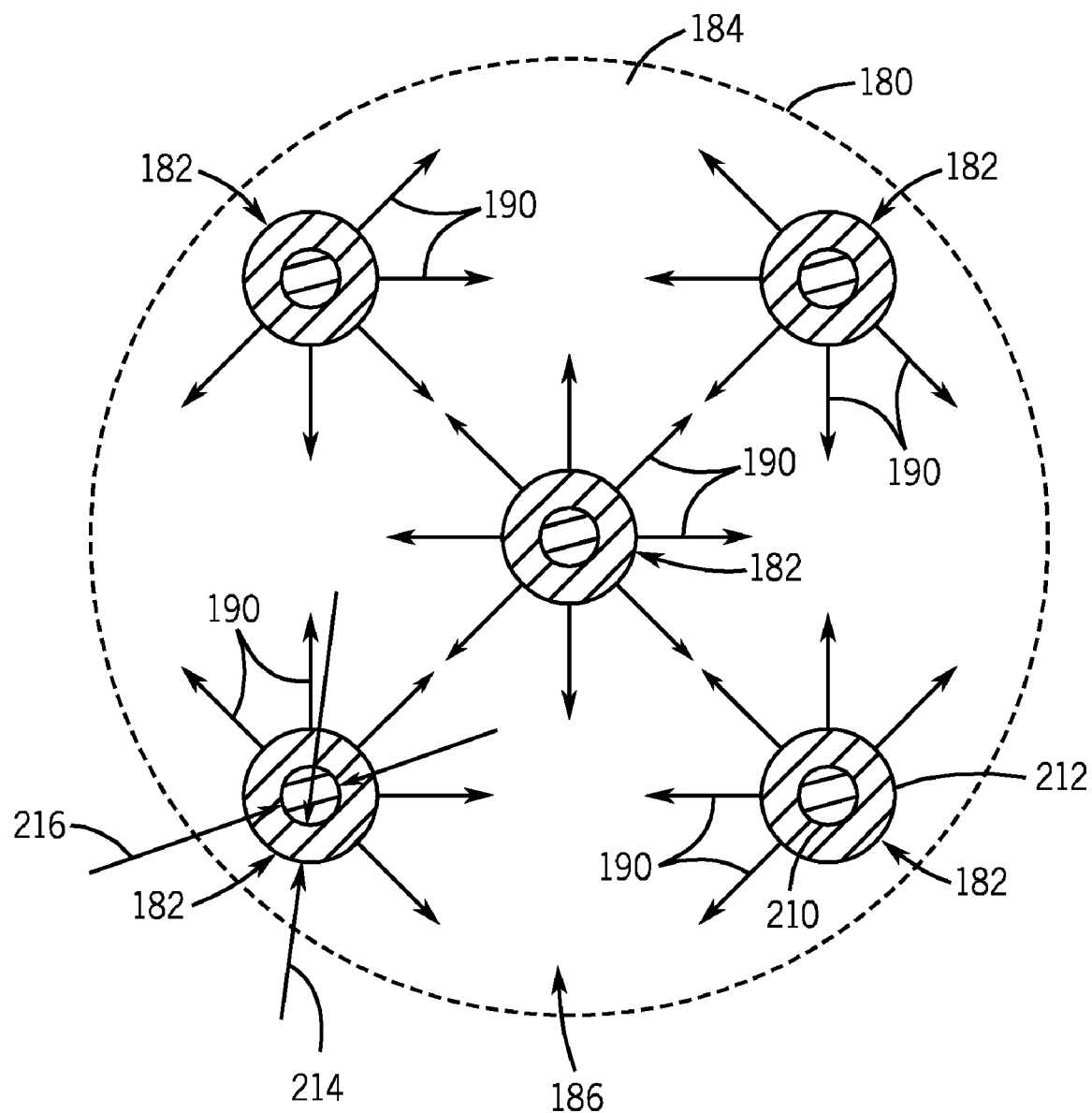
FIG. 6 is a schematic of an embodiment of the self-aligned composite material taken within line 4-4 of FIG. 3, illustrating reinforcing fibers with a core surrounded by a magnetic coating.

FIG. 6 is a schematic of an embodiment of the self-aligned composite material 180 taken within line 4-4 of FIG. 3, illustrating reinforcing fibers 182 with a core 210 surrounded by a magnetic coating 212. For example, the magnetic coating 212 may be made of iron, nickel, cobalt, or their compounds. More specifically, the magnetic coating 212 may be made of Fe2O3, chromium oxide, europium oxide, NiZn-lerrite, MnZn-lerrite, yttrium-iron garnet, or a combination thereof. The core 210 may be made with a different magnetic material, a plastic, a ceramic, or any other suitable material. More specifically, the core 210 may be a natural fiber or a synthetic fiber. For example, the core 210 may include a natural fiber, such as vegetable fiber, wood fiber, animal fiber, mineral fiber, a silicon fiber, or a combination thereof. By further example, the core 210 may include a synthetic fiber, such as a cellulose fiber, a mineral fiber (e.g., fiberglass, metal fiber, or carbon fiber), a polymer fiber (e.g., nylon, polyester, polyvinyl chloride fiber, polyolefin fiber, aramid fiber, polyethylene fiber, polyurethane fiber, or elastomer fiber), a silicon fiber, or a combination thereof.

In certain embodiments, the magnetic coating 212 may have a thickness 214 of less than approximately 5, 10, 15, or 20 percent of a diameter 216 of the core 210. For example, an exemplary embodiment of the core 210 may be approximately 2 to 10 mm, 4 to 8 mm, or 6 mm in diameter 216. By further example, the thickness 214 of the magnetic coating 212 may range between approximately 1 to 20, 1 to 10, or 1 to 5 percent of the diameter 216 of the core 210. An exemplary embodiment of the coating 212 may be a nanocoating of approximately 1 to 500 nm, 1 to 300 nm, or 1 to 100 nm in thickness 214.

The self-aligned composite material 180 may be formed by a variety of techniques. For example, a preparation process may begin with preparation of the reinforcing fibers 182, followed by distribution of the fibers 182 in the matrix material 184. In certain embodiments, the preparation process may include forming the magnetic coating 212 by precipitating a magnetic coating material (e.g., iron, nickel, or cobalt) onto the core 210 of each fiber 182. For example, the preparation process may include forming a coating solution by dissolving a binder material into a solvent, and mixing a magnetic powder with the coating solution. The binder material may include an organic polymer, silicon, or any combination thereof. In certain embodiments, the magnetic powder may have a powder particle thickness of approximately 1 to 500 nm, 1 to 300 nm, or 1 to 100 nm. The preparation process may then proceed to mix a multitude of cores 200 with the coating solution. The preparation process then precipitates the magnetic coating 212 (including the magnetic powder) onto each magnetic core 200, thereby forming the fibers 182 (e.g., coated magnetic cores). The preparation process may then separate the fibers 182 from the coating solution and dry the fibers 182. Finally, the preparation process may combine the fibers 182 with the matrix material 184 in a mold under the influence of a magnetic field. However, as appreciated, the disclosed embodiments may employ any suitable techniques to prepare the self-aligned composite material 180.

Again, similar to the embodiment of FIG. 4, the magnetic coating 212 provides the self-aligning magnetic forces 190 completely around the respective fiber 182. In certain embodiments, the self-aligning magnetic forces 190 are uniform about each fiber 182, while also being uniform from one fiber 182 to another. The uniformity of these self-aligning magnetic forces 190 enables the fibers 182 to self-align with one another inside the matrix material 184. In other words, the self-aligning magnetic forces 190 bias the fibers 182 into the uniform spacing 186, e.g., during and/or after manufacturing.

Figure 7:
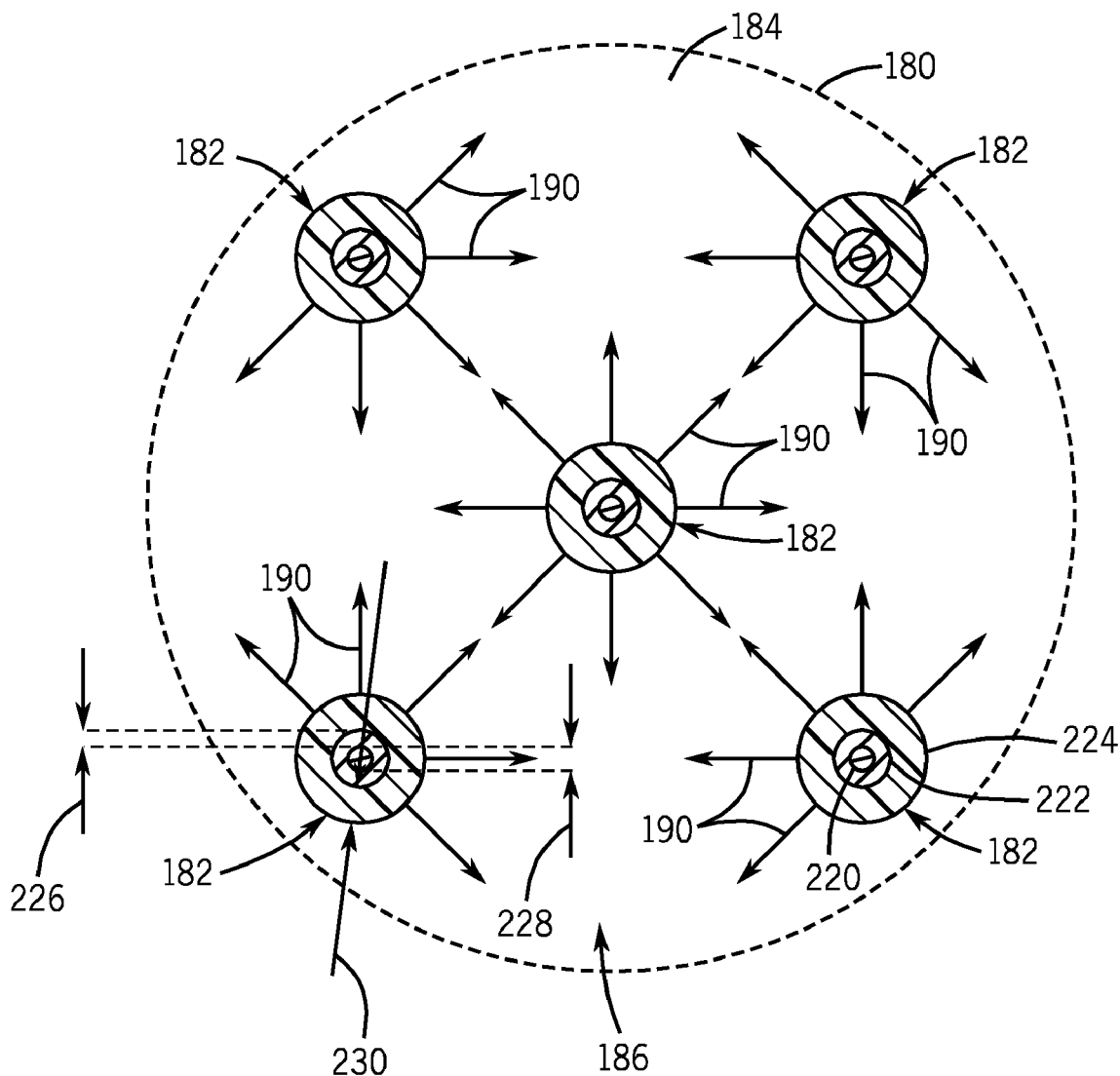
FIG. 7 is a schematic of an embodiment of the self-aligned composite material taken within line 4-4 of FIG. 3, illustrating reinforcing fibers with a core surrounded by a magnetic coating and an outer coating.

FIG. 7 is a schematic of an embodiment of the self-aligned composite material 180 taken within line 4-4 of FIG. 3, illustrating reinforcing fibers 182 with a core 220 surrounded by a magnetic coating 222 and an outer coating 224. For example, the magnetic coating 222 may be made of iron, nickel, cobalt, or their compounds. More specifically, the magnetic coating 222 may be made of Fe2O3, chromium oxide, europium oxide, NiZn-lerrite, MnZn-lerrite, yttrium-iron garnet, or a combination thereof. The core 220 may be made with a different magnetic material, a plastic, a ceramic, or any other suitable material. More specifically, the core 220 may be a natural fiber or a synthetic fiber as described above with reference to FIG. 6. The outer coating 224 may be made with a different magnetic material, a plastic, a ceramic, or any other suitable material. More specifically, the outer coating 224 may be a protective coating, such as a polymer coating, a zinc coating, a silicon coating, or a combination thereof.

In certain embodiments, the magnetic coating 222 may have a thickness 226 of less than approximately 5, 10, 15, or 20 percent of a diameter 228 of the core 220. For example, the thickness 226 of the magnetic coating 222 may range between approximately 1 to 5 percent of the diameter 228 of the core 220. An exemplary embodiment of the coating 222 may be a nanocoating of approximately 1 to 500 nm, 1 to 300 nm, or 1 to 100 nm in thickness 226. Likewise, the outer coating 224 may have a thickness 230 of less than approximately 5, 10, 15, or 20 percent of the diameter 228 of the core 220. For example, the thickness 230 of the outer coating 224 may range between approximately 1 to 5 percent of the diameter 228 of the core 220. An exemplary embodiment of the outer coating 224 may be a nanocoating of approximately 1 to 500 nm, 1 to 300 nm, or 1 to 100 nm in thickness 230.

Again, similar to the embodiment of FIG. 4, the magnetic coating 222 provides the self-aligning magnetic forces 190 completely around the respective fiber 182. In certain embodiments, the self-aligning magnetic forces 190 are uniform about each fiber 182, while also being uniform from one fiber 182 to another. The uniformity of these self-aligning magnetic forces 190 enables the fibers 182 to self-align with one another inside the matrix material 184. In other words, the self-aligning magnetic forces 190 bias the fibers 182 into the uniform spacing 186, e.g., during and/or after manufacturing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A composite material, comprising:
a matrix material; and
a plurality of fibers disposed in the matrix material, wherein each fiber in the plurality of fibers comprises a magnetized material that internally generates a magnetic field, and the magnetic fields of the plurality of fibers magnetically self-align and self-correct the plurality of fibers in a substantially uniform spacing within the matrix material.

2. The composite material of claim 1, wherein each fiber of the plurality of fibers comprises a magnetized coating of the magnetized material disposed about a fiber core.

3. The composite material of claim 2, wherein the magnetized coating has a thickness of approximately 1 to 500 nm.

4. The composite material of claim 2, wherein the magnetized coating comprises a magnetic powder mixed with a binder material.

5. The composite material of claim 4, wherein the magnetic powder comprises a powder particle thickness of approximately 1 to 500 nm.

6. The composite material of claim 2, wherein each fiber is a natural fiber or a synthetic fiber, and each fiber core is made of iron, nickel, cobalt, or compounds thereof.

7. The composite material of claim 2, wherein each fiber of the plurality of fibers comprises a coating disposed about the magnetized coating.

8. The composite material of claim 7, wherein the coating comprises a polymer coating, a zinc coating, a silicon coating, or a combination thereof.

9. The composite material of claim 1, wherein each fiber of the plurality of fibers comprises a coating disposed about a magnetized fiber core made of the magnetized material.

10. A composite material, comprising:
a matrix material; and
a plurality of fibers disposed in the matrix material, wherein each fiber of the plurality of fibers comprises a coating disposed about a magnetized fiber core of a magnetized material, and the magnetized fiber cores of the plurality of fibers magnetically self-align the plurality of fibers in a substantially uniform spacing within the matrix material.

11. The composite material of claim 10, wherein each magnetized fiber core comprises a supermalloy.

12. The composite material of claim 10, wherein each coating has a thickness of less than approximately 10 percent of a diameter of the respective magnetized fiber core.

13. The composite material of claim 10, wherein each coating has a thickness of less than approximately 100 nm.

14. The composite material of claim 10, wherein each coating comprises a polymer coating, a zinc coating, a silicon coating, or a combination thereof.

15. The composite material of claim 10, wherein each magnetized fiber core generates a magnetic field, and the magnetic fields of the plurality of fibers magnetically self-align the plurality of fibers in the substantially uniform spacing within the matrix material.

16. A composite material, comprising:
a matrix material; and
a plurality of fibers disposed in the matrix material, wherein each fiber of the plurality of fibers comprises a magnetized coating of a magnetized material disposed about a fiber core, and the magnetized coatings of the plurality of fibers magnetically self-align the plurality of fibers in a substantially uniform spacing within the matrix material.

17. The composite material of claim 16, wherein each magnetized coating comprises a supermalloy.

18. The composite material of claim 16, wherein each magnetized coating has a thickness of less than approximately 10 percent of a diameter of the respective fiber core.

19. The composite material of claim 16, wherein each fiber of the plurality of fibers comprises a coating disposed about the respective magnetized coating, and each coating comprises a polymer coating, a zinc coating, a silicon coating, or a combination thereof.

20. The composite material of claim 16, wherein each magnetized coating generates a magnetic field, and the magnetic fields of the plurality of fibers magnetically self-align the plurality of fibers in the substantially uniform spacing within the matrix material.

21. The composite material of claim 1, wherein the composite material is formed into a turbine component.

22. The composite material of claim 10, wherein the magnetized fiber cores of the plurality of fibers magnetically self-correct the plurality of fibers in the substantially uniform spacing within the matrix material.

23. The composite material of claim 16, wherein the magnetized coatings of the plurality of fibers magnetically self-correct the plurality of fibers in the substantially uniform spacing within the matrix material.

* * * * *